United States Patent [19]

Fornasari et al.

[11] Patent Number: 5,302,365
[45] Date of Patent: Apr. 12, 1994

[54] PROCESS FOR THE CATALYTIC COMBUSTION OF METHANE

[75] Inventors: Giuseppe Fornasari, Cremona; Stefano Palmery, Milan; Gianluca Calestani, Parma, all of Italy

[73] Assignee: Eniricerche S.p.A., Milan, Italy

[21] Appl. No.: 975,793

[22] Filed: Nov. 13, 1992

[30] Foreign Application Priority Data

Nov. 15, 1991 [IT] Italy .................. 003056 A/91

[51] Int. Cl.$^5$ .................................. C01B 31/20
[52] U.S. Cl. .................... 423/437; 423/245.3; 431/7
[58] Field of Search ............ 423/245.3, 437 R; 431/7

[56] References Cited

U.S. PATENT DOCUMENTS

| | | | |
|---|---|---|---|
| 3,966,391 | 6/1976 | Hindin et al. | 431/7 |
| 4,021,185 | 5/1977 | Hindin et al. | 431/7 |
| 4,197,701 | 4/1980 | Boyum | 431/7 |
| 4,368,029 | 1/1983 | Lacroix | 431/7 |
| 4,793,797 | 12/1988 | Kato et al. | 431/7 |
| 4,886,017 | 12/1989 | Viani | 431/7 |

FOREIGN PATENT DOCUMENTS 86336293 11/1986 European Pat. Off. .
92014544 4/1991 European Pat. Off. .
4103431 8/1991 Fed. Rep. of Germany .

OTHER PUBLICATIONS

R. B. Anderson et al, "Catalytic Oxidation of Methane", *Industrial and Engineering Chemistry*, vol. 53, No. 10, (Oct. 1961), pp. 809–812.
G. J. K. Acres, Ph.D., Platinum Metal Review, Platinum Catalysts for the Control of Air Pollution–The Elimination of Organic Fume By Catalytic Combustion, vol. 14, No. 1, pp. 1–11 (Jan. 1970).
A. Schwartz et al., Journal of Catalysis, Catalytic Oxidation Studies With Platinum and Palladium, vol. 21, pp. 199–207 (1971).
Yu Yao et al., Journal of Catalysis, The Oxidation of CO and $C_2H_4$ Over Metal Oxides, vol. 39, pp. 104–114 (1975).
L. Y. Margolis, Adv. Catal. Relates Subjects, Catalytic Oxidation of Hydrocarbons, vol. 14, pp. 429–501 (1963).
Arai et al., Applied Catalysis, Catalytic Combustion of Methane Over Various Perovskite-Type Oxides, vol. 26, pp. 265–276 (1986).

*Primary Examiner*—Wayne Langel
*Attorney, Agent, or Firm*—George P. Hoare, Jr.

[57] ABSTRACT

A methane catalytic combustion process using heat-resistant catalysts consisting of metal oxide mixtures of pyrochloric structure. The process is usable in gas turbines and boilers.

14 Claims, No Drawings

PROCESS FOR THE CATALYTIC COMBUSTION OF METHANE

This invention relates to a methane catalytic combustion process using heat resistant catalysts consisting of a metal oxide mixtures of pyrochloric structure. The process can be used in gas turbines and boilers.

Catalytic combustion has various advantages over non-catalytic combustion, including easy control of the oxidation reaction, reduction in pollutant emission and increase in energy recovery efficiency. It consists of passing a mixture of fuel and air over a catalyst maintained at sufficiently high temperature to achieve total oxidation. The ensuing reaction releases energy and leads to the formation of carbon dioxide and water which can be released to the atmosphere. This reaction can be used both to generate energy, for example in gas turbines, and to remove pollutants, for example to purify vehicle exhaust gas and industrial offgas.

During catalytic combustion the reaction temperature is lower than that attained during combustion in the absence of catalyst, and consequently the formation of pollutants such as nitrogen oxides is greatly reduced.

In spite of many advantages there is however the problem of finding heat resistant catalysts. Catalysts used for combustion purposes include for example the noble metals (Acres, Platinum Met. Rev. 14, 1970, 2; Schwartz, J. Cat. 21, 1971, 199). However because of their volatility they can be applied only in combustion reactions at temperatures less than 1000° C., such as in the removal of carbon monoxide and hydrocarbons in automobile exhaust gases, deodorizing and flameless combustion. These catalysts are therefore unusable under high temperature conditions such as in gas turbines, which operate at a temperature exceeding 1200° C., and in boilers.

Metal oxides or their mixtures, for example oxides of perovskite structure, are also used as oxidation catalysts (Yu Yao, J. Cat. 39, 1975, 104; Margolis, Adv. Catal. Related Subjects, 14, 1963, 429; JP 61161144). However in this case after calcining at very high temperature a considerable reduction in catalytic activity is noted probably due to the drastic reduction in surface area. Dispersing these metal oxides on an adequate support enables interesting performance to be obtained (Arai et al., Appl. Catal. 26, 265, 1986).

We have now found a catalyst for the catalytic combustion of methane which is very active even after exposure to the high temperatures occurring for example in a gas turbine. The present invention therefore provides a methane oxidation process consisting of reacting it with oxygen or air in the presence of a high temperature resistant catalyst consisting of a metal oxide mixture of pyrochloric structure having the following general formula:

$$X_a Y_b Z_c Sn_2 O_7$$

where
X is a trivalent metal cation
Y is a tetravalent metal cation
Z is a bivalent metal cation
$0 \leq a \leq 2$
$0 \leq b \leq 1$
$0 \leq c \leq 1$
$a + b + c = 2$ The trivalent metal cation is chosen from the transition metals, the lanthanides, indium, thallium and mixtures thereof.

Preferably X is a lanthanide.

The bivalent metal is chosen from the alkaline-earth metals, the transition metals and mixtures thereof. Preferably Z is a transition metal.

The tetravalent metal cation is chosen from germanium, tin, lead, cerium, transition metals and mixtures thereof. Preferably Y is tin or cerium. In general to obtain a pyrochloric structure the ratio of the weighted average of the radii of the metal cations to the radius of the tin must be between 1.4 and 2.2.

The process of the present invention is conducted at a temperature generally of between 600° and 1400° C. and preferably between 1100° and 1300° C.

The total gas pressure can vary from 1 to 25 atm depending on the particular practical application of the process. In a gas turbine for example the pressure is generally greater than 1.5 atm, and preferably between 1.5 and 10 atm.

The methane concentration in the methane-oxygen or methane-air mixture is between 0.2 and 10.0 vol %, and preferably between 1 and 5 vol %.

The metal oxide mixture of pyrochloric structure which can be used as catalyst in the process of the present invention is obtained by reacting, preferably in stoichiometric ratio, one or more sources of metal cations X, Y and Z with a source of tin. Preferably these sources of metal cations and tin are chosen from nitrates, carbonates, acetates, oxides and halides. The mixture of metal compounds and tin is calcined at a temperature of between 800° and 1400° C. for a time of between 5 and 80 hours. In this manner a product of pyrochloric structure is obtained having a surface area generally of between 5 and 40 m$^2$/g.

The examples given hereinafter explain the invention. In particular, Examples 1–3 describe catalyst preparation procedures, Example 4 is a test regarding the life of one of the catalysts, demonstrating its stability under high temperature for a long period of time, Example 5 shows the results of catalytic combustion experiments and Example 6 relates to a comparative combustion test in the absence of catalyst. The tests were conducted by calcining the catalysts at high temperature and then testing at the lowest temperature at which significant activity was observed. These tests were effected in a similar manner to those reported in the literature (Arai et al., Appl. Catal., 26, 265, 1986) and show whether a catalyst remains active after calcining at high temperature.

EXAMPLE 1

Synthesis of the pyrochloric compound Nd$_2$Sn$_2$O$_7$ 8.4 g of Nd(NO$_3$)$_3$.5H$_2$O and 3.0 g of SnO$_2$ are mixed together in a mortar. The mixture is calcined at 900° C. for 10 hours, triturated and again calcined at 1250° C. for 10 hours. The material obtained was characterised by powder X-ray diffraction and shows a single-phase pyrochloric structure.

The lattice parameters are shown in Table 1. The surface area is 6.5 m$^2$/g.

EXAMPLE 2

Synthesis of the pyrochloric compound $Gd_2Sn_2O_7$ 8.66 g of $Gd(NO_3)_3.5H_2O$ and 3.01 g of $SnO_2$ are mixed together in a mortar. The mixture is calcined at 950° C. for 8 hours, triturated and again calcined at 1000° C. for 12 hours, at 1100° C. for 12 hours, at 1200° C. for 24 hours and at 1250° C. for 8 hours. The material obtained was characterised by powder X-ray diffraction and shows a single-phase pyrochloric structure.

The lattice parameters are shown in Table 2. The surface area is 6.0 $m^2/g$.

EXAMPLE 3

Synthesis of the pyrochloric compound $MnCeNd_2(Sn_2O_7)_2$ 4.20 g of $Nd(NO_3)_3.5H_2O$, 3.01 g of $SnO_2$, 0.86 g of $CeO_2$ and 1.22 g of $M_n(CH_3COO)_2.4H_2O$ are mixed together in a mortar. The mixture is calcined at 950° C. for 8 hours, triturated and again calcined at 1200° C. for 60 hours and at 1250° C. for 8 hours. The material obtained was characterised by powder X-ray diffraction and shows a single-phase pyrochloric structure. The lattice parameters are shown in Table 3. The surface area is 7.0 $m^2/g$.

EXAMPLE 4

The catalyst prepared in Example 1 was maintained at a temperature of 1250° C. for 120 hours. After this thermal treatment the material shows a single-phase pyrochloric structure with a surface area of 6.0 $m^2/g$. This test demonstrates the high thermal stability of the catalysts of pyrochloric structure used in the present invention.

EXAMPLE 5

Methane oxidation

The catalysts of Examples 1 to 4 were used in methane catalytic combustion tests. The tests are conducted in a fixed-bed quartz microreactor of 4 mm diameter containing 0.4 cc of catalyst in the form of granules of size between 40 and 70 mesh. Methane and air are fed to the reactor such that the methane concentration is 1 vol %. The test is conducted at atmospheric pressure at a space velocity expressed as GHSV of 48000 $h^{-1}$. The results of these activity tests are shown in Table 4, in which conversion means the moles of methane converted as a percentage of the moles of methane fed, and selectivity means the moles of $CO_2$ formed as a percentage of the moles of methane converted.

EXAMPLE 6—(comparative)

A test is conducted under the conditions described in Example 5 in which, instead of the catalyst, 0.4 cc of inert material (quartz) in the form of granules of size between 40 and 70 mesh are placed in the reactor. The test results are shown in Table 4.

TABLE 1

| 2THETA | d | I/Io | CPS | hkl |
|---|---|---|---|---|
| 29.34 | 3.0444 | 100 | 7487 | 222 |
| 33.99 | 2.6371 | 31 | 2317 | 400 |
| 37.14 | 2.4204 | 2 | 120 | 331 |
| 44.58 | 2.0322 | <1 | 16 | 511 |
| 48.78 | 1.8668 | 28 | 2067 | 440 |
| 57.90 | 1.5926 | 25 | 1908 | 622 |
| 60.72 | 1.5251 | 8 | 563 | 444 |
| 71.40 | 1.3211 | 5 | 364 | 800 |

TABLE 1-continued

| 2THETA | d | I/Io | CPS | hkl |
|---|---|---|---|---|
| 78.96 | 1.2125 | 12 | 930 | 662 |

TABLE 2

| 2THETA | d | I/Io | CPS | hkl |
|---|---|---|---|---|
| 28.61 | 3.1196 | 2 | 180 | imp. |
| 29.58 | 3.0201 | 100 | 7215 | 222 |
| 33.14 | 2.7028 | 3 | 215 | imp. |
| 34.29 | 2.6154 | 37 | 2634 | 400 |
| 49.27 | 1.8495 | 41 | 2936 | 440 |
| 58.51 | 1.5776 | 25 | 1801 | 622 |
| 61.37 | 1.5107 | 5 | 368 | 444 |
| 72.21 | 1.3083 | 5 | 369 | 800 |
| 79.90 | 1.2005 | 17 | 1242 | 662 |

TABLE 3

| 2THETA | d | I/Io | CPS | hkl |
|---|---|---|---|---|
| 26.65 | 3.3452 | 1 | 71 | imp. |
| 28.57 | 3.1244 | 6 | 346 | imp. |
| 29.43 | 3.0347 | 100 | 5765 | 222 |
| 33.10 | 2.7060 | 2 | 95 | imp. |
| 34.11 | 2.6284 | 31 | 1808 | 400 |
| 37.24 | 2.4146 | 1 | 49 | 331 |
| 47.50 | 1.9140 | 3 | 153 | imp. |
| 48.98 | 1.8595 | 37 | 2160 | 440 |
| 58.17 | 1.5859 | 30 | 1743 | 622 |
| 61.01 | 1.5186 | 4 | 249 | 444 |
| 71.76 | 1.3154 | 2 | 117 | 800 |
| 79.37 | 1.2072 | 6 | 320 | 662 |

TABLE 4

| Example | T (°C.) | $CH_4$ Conversion (%) | $CO_2$ Selectivity (%) |
|---|---|---|---|
| 1 | 600 | 16.0 | 100 |
|  | 700 | 57.4 | 100 |
|  | 750 | 81.7 | 100 |
|  | 800 | 100 | 100 |
| 2 | 600 | 15.1 | 100 |
|  | 700 | 61.3 | 100 |
|  | 750 | 85.9 | 100 |
|  | 800 | 100 | 100 |
| 3 | 600 | 23.9 | 100 |
|  | 700 | 59.6 | 100 |
|  | 750 | 79.5 | 100 |
|  | 800 | 99.3 | 100 |
| 4 | 600 | 16.6 | 100 |
|  | 700 | 65.0 | 100 |
|  | 750 | 85.0 | 100 |
|  | 800 | 100 | 100 |
| 6 | 800 | 14.1 | 100 |
|  | 820 | 32.6 | 100 |
|  | 850 | 69.6 | 100 |
|  | 870 | 95.0 | 100 |

We claim:

1. A methane combustion process comprising reacting methane with oxygen or air in the presence of a heat-resistant catalyst of pyrochloric structure having the following formula:

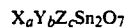

where
X is a trivalent metal cation
Y is a tetravalent metal cation
Z is a bivalent metal cation
$0 \leq a \leq 2$
$0 \leq b \leq 1$
$0 \leq c \leq 1$
$a+b+c=2$, to selectively produce $CO_2$ by methane combustion.

2. A process as claimed in claim 1, wherein the trivalent metal cation is selected from the group consisting of transition metals, lanthanides, indium, thallium and mixtures thereof.

3. A process as claimed in claim 2, wherein the trivalent metal cation is one of the lanthanides.

4. A process as claimed in claim 1, wherein the bivalent metal cation is selected from the group consisting of alkaline-earth metals, transition metals and mixtures thereof.

5. A process as claimed in claim 4, wherein the bivalent metal cation is one of the transition metals.

6. A process as claimed in claim 1, wherein the tetravalent metal cation is selected from the group consisting of germanium, tin, lead, cerium, transition metals and mixtures thereof.

7. A process as claimed in claim 6, wherein the tetravalent metal cation is selected from the group consisting of tin and cerium.

8. A process as claimed in claim 1, wherein the reaction temperature is between 600° and 1400° C.

9. A process as claimed in claim 8, wherein the reaction temperature is between 1100° and 1300° C.

10. A process as claimed in claim 1, wherein the methane concentration in the methane-oxygen or methane-air mixture is between 0.2 and 10.0% by volume.

11. A process as claimed in claim 10, wherein the methane concentration in the methane-oxygen or methane-air mixture is between 1 and 5% by volume.

12. A process as claimed in claim 1, wherein the catalyst of pyrochloric structure is $Nd_2Sn_2O_7$.

13. A process as claimed in claim 1, wherein the catalyst of pyrochloric structure is $Gd_2Sn_2O_7$.

14. A process as claimed in claim 1, wherein the catalyst of pyrochloric structure is $Mn_{0.5}Ce_{0.5}NdSn_2O_7$.

* * * * *